(12) United States Patent
Babazadeh et al.

(10) Patent No.: US 9,793,799 B1
(45) Date of Patent: Oct. 17, 2017

(54) METHOD AND APPARATUS FOR CONTROL OF SEMI-RESONANT AND RESONANT CONVERTERS

(71) Applicant: Infineon Technologies Austria AG, Villach (AT)

(72) Inventors: Amir Babazadeh, Laguna Hills, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/158,318

(22) Filed: May 18, 2016

(51) Int. Cl.
*H02M 3/157* (2006.01)
*H02M 3/158* (2006.01)
*H02M 1/08* (2006.01)

(52) U.S. Cl.
CPC ............. *H02M 3/157* (2013.01); *H02M 1/08* (2013.01); *H02M 3/158* (2013.01)

(58) Field of Classification Search
CPC ... H02M 3/157; H02M 3/1584; H02M 3/1588
USPC .................................................. 323/271, 283
See application file for complete search history.

(56) References Cited

U.S. PATENT DOCUMENTS

| | | | | |
|---|---|---|---|---|
| 7,479,772 B2 * | 1/2009 | Zane | ....................... | H02J 1/102 323/272 |
| 7,492,134 B2 * | 2/2009 | Tang | ................... | H02M 3/1584 323/241 |
| 7,521,913 B2 * | 4/2009 | Tang | .................... | H02M 3/1584 323/272 |
| 7,755,342 B2 * | 7/2010 | Chen | ...................... | H02M 3/156 323/271 |
| 7,772,811 B1 * | 8/2010 | Jain | ........................ | H02M 3/157 323/224 |
| 8,274,265 B1 * | 9/2012 | Khanna | ................ | H02M 3/1584 323/225 |
| 9,231,463 B2 * | 1/2016 | Oaklander | ........... | H03K 17/063 |
| 2006/0132110 A1 * | 6/2006 | Tang | ..................... | H02M 3/157 323/282 |

(Continued)

OTHER PUBLICATIONS

Hwu, K. I. et al., "Ultrahigh Step-Down Converter", IEEE Transactions on Power Electronics, vol. 30, No. 6, Jun. 2015, pp. 3262-3274.

*Primary Examiner* — Jeffrey Sterrett
(74) *Attorney, Agent, or Firm* — Murphy, Bilak & Homiller, PLLC (57) ABSTRACT

A state machine for a multi-phase voltage converter controls cycle-by-cycle switching of the phases by: entering a first state in which a control signal for the high-side switch is activate and control signals for the low-side and SR (synchronous rectification) switches are deactivate; entering a second state in which the control signals for all switches are deactivate; entering a third state in which the control signal for the high-side switch is deactivate and the control signals for the low-side and SR switches are activate; entering a fourth state in which the control signals for the high-side and low-side switches are deactivate and the control signal for the SR switch is activate and then entering a fifth state in which the control signals for all switches are deactivate, or entering the fifth state without entering the fourth state; and entering the first state at the beginning of the next switching cycle.

21 Claims, 5 Drawing Sheets

(56) References Cited

U.S. PATENT DOCUMENTS

| | | | |
|---|---|---|---|
| 2007/0262802 A1* | 11/2007 | Huard | H02M 3/157 327/172 |
| 2012/0223692 A1* | 9/2012 | Prodic | H02M 3/1584 323/283 |
| 2015/0115911 A1 | 4/2015 | Parto et al. | |

* cited by examiner

METHOD AND APPARATUS FOR CONTROL OF SEMI-RESONANT AND RESONANT CONVERTERS

TECHNICAL FIELD

The present application relates to semi-resonant and resonant converters, in particular control of semi-resonant and resonant converters.

BACKGROUND

Resonant and semi-resonant DC-DC converters, including isolated and non-isolated topologies, are used in a variety of applications such as telecommunications, processors, etc. because of their zero-voltage (current) switching characteristic and their ability to utilize parasitic components. Among numerous topologies, the semi-resonant converter with transformer/tapped-inductor is an attractive topology for high voltage conversion ratio without isolation. Lower cost and higher efficiency are the main advantages of such converters over other solutions.

The output current of many resonant and semi-resonant DC-DC converters has a half cycle sinusodial-like shape each switching cycle. Fixed frequency control may not be an efficient topology for such converters, so there is a need for variable switching frequency control to achieve optimal performance and provide soft switching for variable frequency operations.

As such, there is a need for variable switching frequency digital control for resonant and semi-resonant DC-DC converters having an output current with a sinusodial-like shape.

SUMMARY

According to an embodiment, a digital control system for a multi-phase voltage converter is provided. Each phase of the voltage converter includes a high-side switch connected between an input voltage terminal and a switching node, a low-side switch connected between the switching node and ground, a passive circuit connecting the switching node to a common output node of the multi-phase voltage converter, and a synchronous rectification (SR) switch connected between the passive circuit and ground and through which a half cycle sinusodial-like current is conducted when turned on. The digital control system comprises a digital PWM (pulse width modulation) state machine operable to control cycle-by-cycle switching of the phases. For each phase, the digital PWM state machine is operable to: at the beginning of each switching cycle, enter a first state in which a control signal for the high-side switch is activate and control signals for the low-side and SR switches are deactivate; exit the first state and enter a second state in which the control signals for all switches are deactivate; exit the second state and enter a third state in which the control signal for the high-side switch is deactivate and the control signals for the low-side and SR switches are activate; exit the third state and enter a fourth state in which the control signals for the high-side and low-side switches are deactivate and the control signal for the SR switch is activate and then exit the fourth state and enter a fifth state in which the control signals for all switches are deactivate, or exit the third state and enter the fifth state without entering the fourth state; and exit the fifth state and enter the first state at the beginning of the next switching cycle.

According to an embodiment of digitally controlling cycle-by-cycle switching of the multi-phase voltage converter, the method comprises for each phase: at the beginning of each switching cycle, entering a first state of a digital PWM (pulse width modulation) state machine in which a control signal for the high-side switch is activate and control signals for the low-side and SR switches are deactivate; exiting the first state and entering a second state of the digital PWM state machine in which the control signals for all switches are deactivate; exiting the second state and entering a third state of the digital PWM state machine in which the control signal for the high-side switch is deactivate and the control signals for the low-side and SR switches are activate; exiting the third state and entering a fourth state of the digital PWM state machine in which the control signals for the high-side and low-side switches are deactivate and the control signal for the SR switch is activate and then exiting the fourth state and entering a fifth state of the digital PWM state machine in which the control signals for all switches are deactivate, or exiting the third state and entering the fifth state without entering the fourth state; and exiting the fifth state and entering the first state at the beginning of the next switching cycle.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide a digital state machine-based implementation of a PWM (pulse width modulation) generator that provides variable switching frequency control for resonant and semi-resonant DC-DC converters having phase output current with a sinusodial-like shape. The PWM generator, with variable frequency structure, generates the proper gate signals for each phase of a multi-phase resonant or semi-resonant DC-DC converter. The digital state machine-based implementation is suitable for on chip implementation, provides adaptive adjustment of the duty cycle based on the most recent information of the switching period, and yields a highly flexible and easy to tune parameter adjustment with no added analog circuitry requirement.

Figure 1:
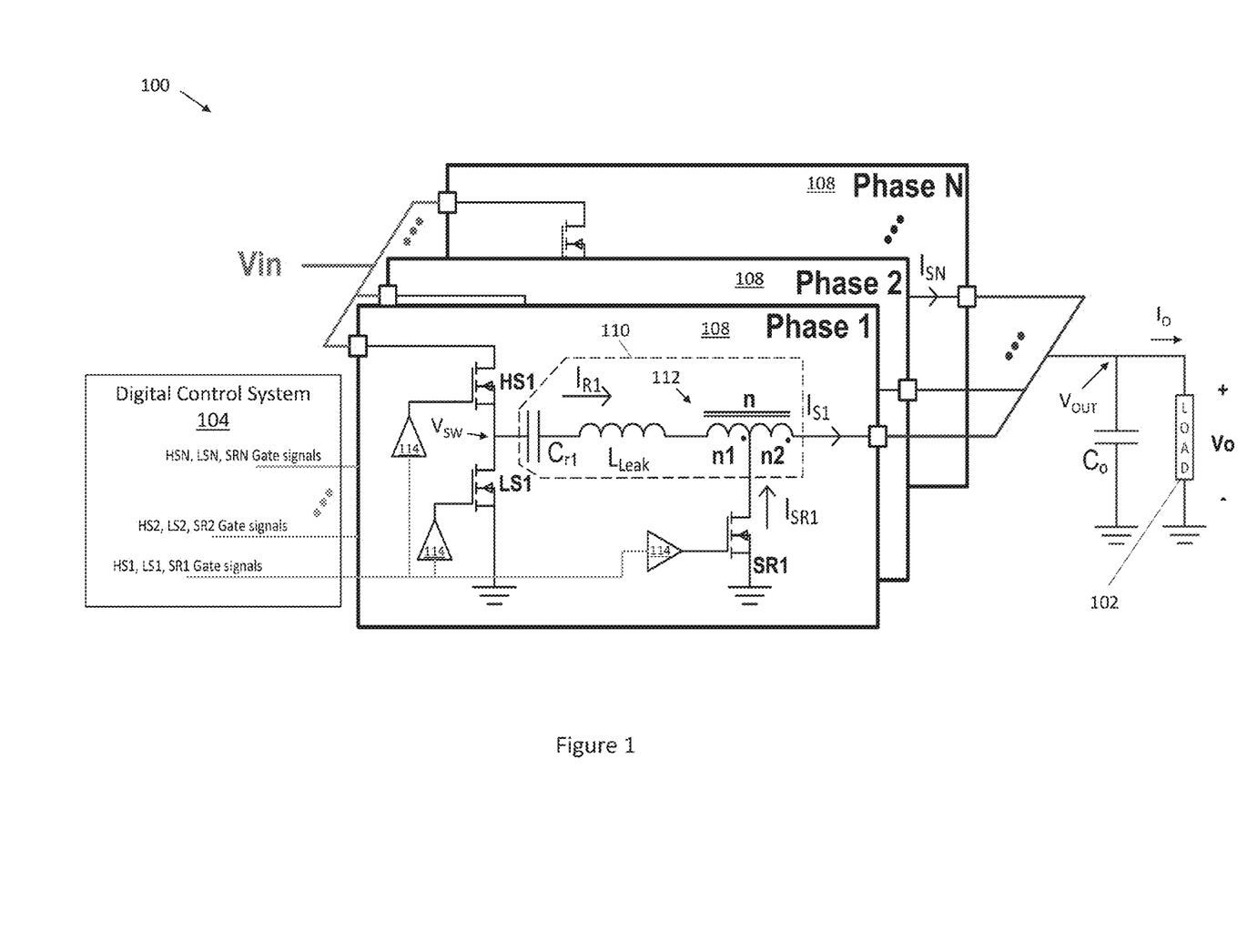
FIG. 1 illustrates a block diagram of an embodiment of a resonant or semi-resonant multi-phase voltage converter having a variable switching frequency.

FIG. 1 illustrates an embodiment of a multi-phase resonant or semi-resonant DC-DC voltage converter 100 having a variable switching frequency (Fsw) and which delivers an output current $I_o$ to a load 102. The multi-phase converter 100 converts an input voltage (Vin) to an output voltage (Vo) at an output node $V_{out}$ under the control of a digital control system 104. Each phase 108 of the multi-phase converter 100 contributes a portion of the output current Io, or all of the output current $I_o$ in the case of only a single phase 108 being active, to the load 102 through a respective passive circuit 110 included in or associated with each phase 108. The type of passive circuit 110 employed depends on the topology of the multi-phase voltage converter 100, which can have an isolated or non-isolated topology and be resonant or semi-resonant. Any standard multi-phase voltage converter can be used so long as the converter has a variable switching frequency and the current ($I_{sN}$) output from each passive circuit 110 has a half cycle sinusodial-like shape i.e. a shape that resembles half a sine wave. For example, the voltage converter 100 can be a semi-resonant converter having a transformer/tapped-inductor 112 for coupling an LC tank of the passive circuit 110 to the output capacitor $C_o$ of the converter 100. Specifically in the case of a hybrid pulse-width modulation/resonant voltage converter, a resonance occurs during the off time (Toff) of the high-side switch HSN of each phase 108. Such a hybrid pulse-width modulation/resonant voltage converter is well-suited for voltage converter applications requiring high speed switching and relatively large step-down voltage conversion ratios.

In addition to the passive circuit 110, each phase 108 of the multi-phase converter 100 includes a high-side switch (HSN) connected between an input voltage terminal Vin and a switching node $V_{sw}$ and a low-side switch (LSN) connected between the switching node $V_{sw}$ and ground. The passive circuit 110 connects the switching node $V_{sw}$ of its phase 108 to a common output node $V_{out}$ of the multi-phase voltage converter 100, and a synchronous rectification switch (SRN) is connected between the passive circuit 110 and ground e.g. between the transformer/tapped-inductor 112 and ground, and a half cycle sinusodial-like current is conducted by the SR switch when turned on.

Each phase 108 of the multi-phase converter 100 also includes a driver stage which includes driver circuitry 114 for driving the high-side power switch HSN, the low-side power switch LSN and the SR switch SRN of the corresponding phase 108. The driver stage of phase N can be integrated on the same semiconductor die as the other phase circuitry, or provided as separate dies. The switches HSN, LSN and SRN of phase N can be integrated on the same semiconductor die, or provided as separate dies.

The high-side power switch HSN, the low-side power switch LSN and the SR switch SRN of each phase 108 can be implemented as silicon or other group IV based metal-oxide-semiconductor field-effect transistors (MOSFETs), for example. The switches HS1, LS1 and SR1 of the first phase ('Phase 1') are depicted as silicon or other group IV FETs in the exemplary implementation shown in FIG. 1 for ease and conciseness of description. However, it is emphasized that such implementations are merely exemplary, and the inventive principles disclosed herein are broadly applicable to a wide range of applications, including voltage converters implemented using other group IV material based, or group III-V semiconductor based, power switches. It is further noted that as used herein, the phrase "group III-V" refers to a compound semiconductor including at least one group III element and at least one group V element. By way of example, a group III-V semiconductor may take the form of a III-Nitride semiconductor that includes nitrogen and at least one group III element. In FIG. 1, MOSFETs have been used to represent the phase switches HSN, LSN and SRN. However, other type of switches, such as bipolar junction transistors (BJTs), insulated-gate bipolar transistors (IGBTs), gallium nitride (GaN) based switches, for example, may be used as well.

As shown in FIG. 1, the digital control system 104, which controls the cycle-by-cycle switching of the switches HSN, LSN and SRN of each phase 108, is coupled to the driver stage of each phase 108. Also shown in FIG. 1 are a resonance capacitor ($C_r$), leakage inductance ($L_{Leak}$) and transformer/center-tapped inductor 112 of the passive circuit 110 which form part of each phase 108. The transformer/center-tapped inductor 112 has N turns (n1+n2), including a primary-side winding with n1 turns and a secondary-side winding with n2 turns.

As further shown in FIG. 1, the high-side power switch HS1 of the first phase 108 receives input voltage Vin at the drain of HS1. The source of high-side power switch HS1 is coupled to the drain of low-side power switch LS1 at the switch node $V_{sw}$ of the first phase 108. Low-side power switch LS1 is in turn coupled between the switch node $V_{sw}$ and ground, i.e., has its source coupled to ground. As also shown in FIG. 1, SR switch SR1 of the first phase 108 has its drain coupled between the primary and secondary windings of the transformer/center-tapped inductor 112 of the corresponding passive circuit 110, and has its source coupled to ground. According to the exemplary implementation shown in FIG. 1, high-side power switch HS1 is configured as a control switch, low-side power switch LS1 is configured as a resonance switch, and SR switch SR1 is configured as a synchronous (sync) switch. The other phases 108 of the multi-phase converter 100 have the same or similar design.

The multi-phase voltage converter 100 shown in FIG. 1 is merely exemplary. Semi-resonant/hybrid voltage converters can be implemented using a number of different circuit configurations, including those utilizing split resonance capacitors and those utilizing an isolation transformer, for example. The inventive principles disclosed herein may be readily adapted to any semi-resonant/hybrid voltage converter including a high-side power switch, and low-side power switch and a synchronous rectification switch through which through which a half cycle sinusodial-like current is conducted when turned on, regardless of the particular circuit configuration employed, and more generally to any voltage converter having a variable switching frequency and a half cycle sinusodial-like synchronous rectification switch current.

Figure 2:
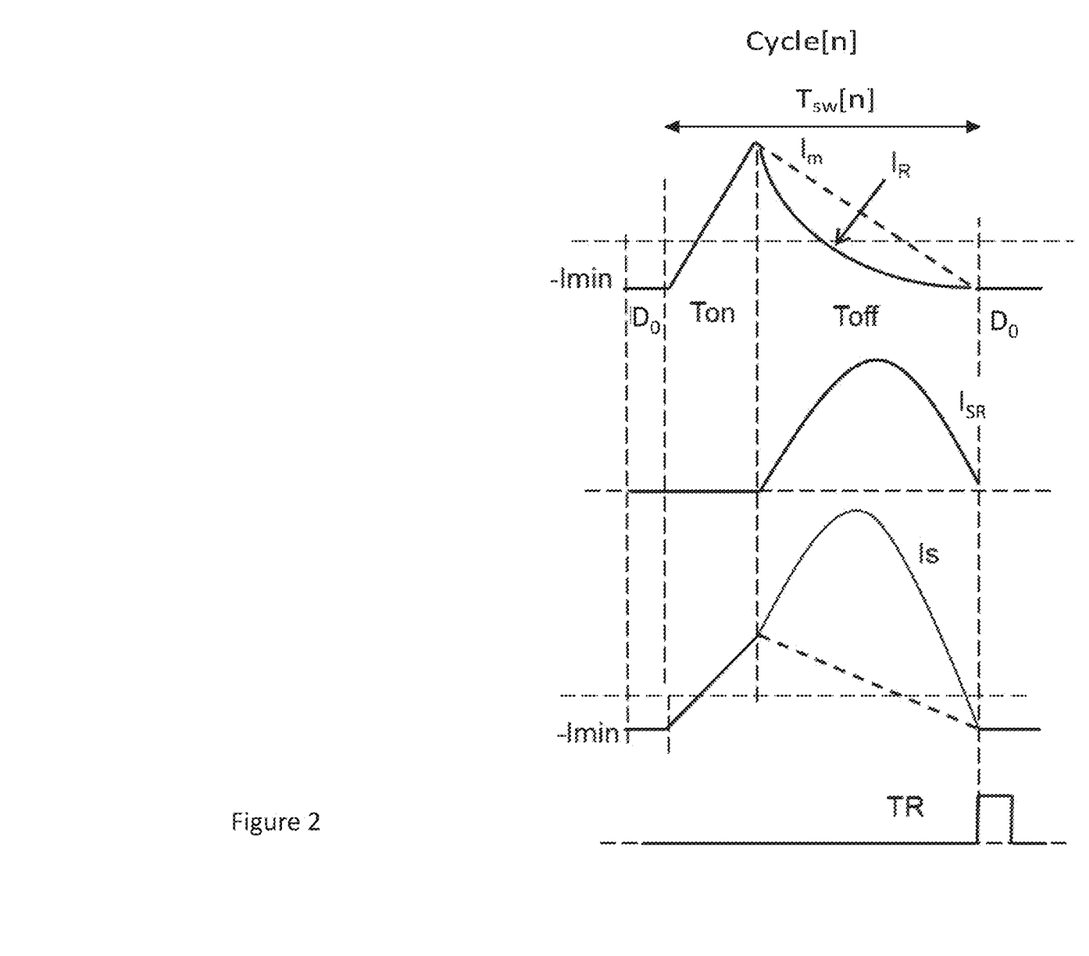
FIGS. 2 and 3 illustrate various waveforms associated with operation of the multi-phase voltage converter of FIG. 1.
Figure 3:
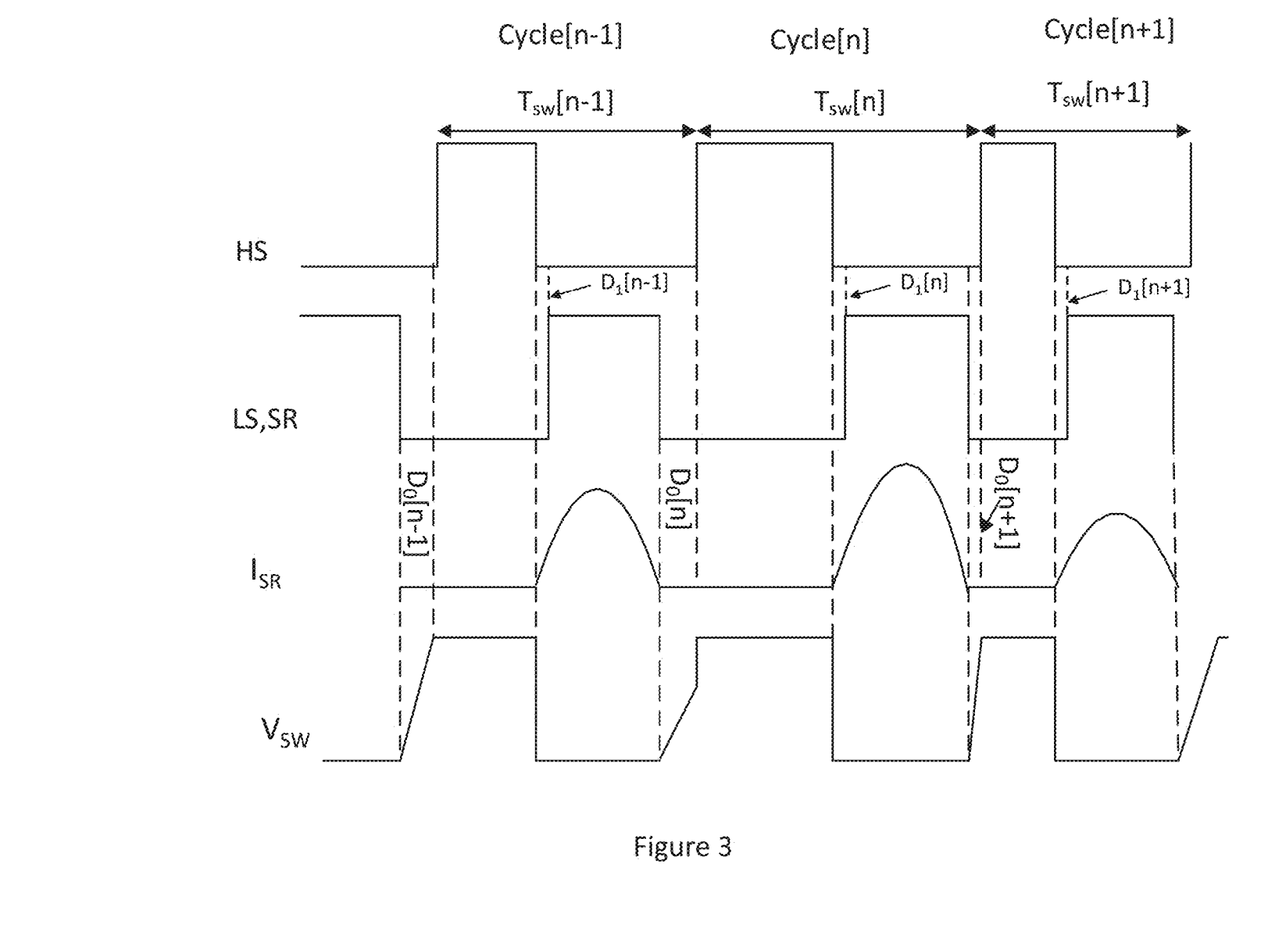

FIGS. 2 and 3 are plot diagrams illustrating various waveforms associated with the cycle-by-cycle ([n−1], [n], [n+1], etc.) operation of one phase 108 of the multi-phase voltage converter 100. This includes respective gate signals HS, LS and SR generated by the digital control system 104 for the standard MOSFETs shown in FIG. 1, secondary current Is at the output of the passive circuit 110 for the phase 108, current Isr conducted through the SR switch of that phase 108, and resonant and magnetizing currents $I_R$, $I_m$ of the passive circuit 110. The secondary current Is and magnetizing current $I_m$ are at a minimum negative value −Imin and the switch node voltage $V_{sw}$ is at or near ground potential at the start of the dead time period $D_0$ just prior to the beginning of the next switching cycle.

All phase switches are off during dead time $D_0$, e.g. HS=0, LS=0 and SR=0 for the gate signals of the standard MOSFETs shown in FIG. 1. Current Imin charges the output capacitance of the low-side switch and causes the switch node voltage $V_{sw}$ to rise to a level near Vin during $D_0$. At the end of dead time $D_0$, the high-side switch turns on, i.e., the "on time" or "Ton" as used herein, and low-side power switch and the SR switch remain off, e.g. by setting HS=1, LS=0 and SR=0 for the gate signals of the standard MOSFETs shown in FIG. 1. During Ton, the switch node voltage $V_{sw}$ is tied to Vin through the high-side power switch and the secondary current Is and magnetizing current $I_M$ of the phase 108 rise in a linear manner e.g. until the magnetizing current $I_m$ reaches a maximum value Imax. The magnetizing current $I_m$ associated with the LC tank formed by resonance capacitor $C_r$, leakage inductance $L_{Leak}$ and magnetizing inductance $L_m$ accounts for the rise in the secondary current Is during Ton.

During the next interval of the present switching cycle, the high-side power switch turns off, i.e., the "off time" or "Toff" as used herein, and the low-side power switch and the SR switch turn on, e.g. by setting HS=0, LS=1 and SR=1 for the gate signals of the standard MOSFETs shown in FIG. 1. The switch node voltage $V_{sw}$ drops to its minimum value when the high-side power switch is off and the low-side power switch and the SR switch are on, because the switch node $V_{sw}$ is coupled to ground though the low-side power switch. A resonance is also formed between resonance capacitor Cr and leakage inductance Lr during Toff. Leakage inductance Lr may be a purely parasitic inductance of the transformer/center-tapped inductor 112, or may include an inductor component in combination with such a parasitic inductance. Moreover, leakage inductance L, is variable because this inductance value can vary over temperature, as well as over variations in the transformer/center-tapped inductor 112.

The resonance formed between resonant capacitor $C_r$ and leakage inductance L during the off time of the high-side power switch results in a resonant current $(I_R)$ flowing through the secondary winding of the transformer/center-tapped inductor 112 which charges output capacitor Co. If the off time of the high-side power switch is optimized with respect to the resonant frequency, the SR switch can be turned off when its current is very small or substantially zero. The secondary current Is rises during Toff due to the secondary side current of the transformer/center-tapped inductor 112 which equals $I_m+(n1/n2)(I_m-I_R)$, where n1 is the number of primary side winding turns and n2 is the number of secondary winding turns of the transformer/center-tapped inductor 112. The point at which $I_R$ crosses $I_M$ signals the end of the present switching cycle to the digital control system 104, so that the control system 104 knows when to force the multi-phase voltage converter 100 into the next cycle starting with dead time D0 in which all phase switches are again turned off.

Figure 4:
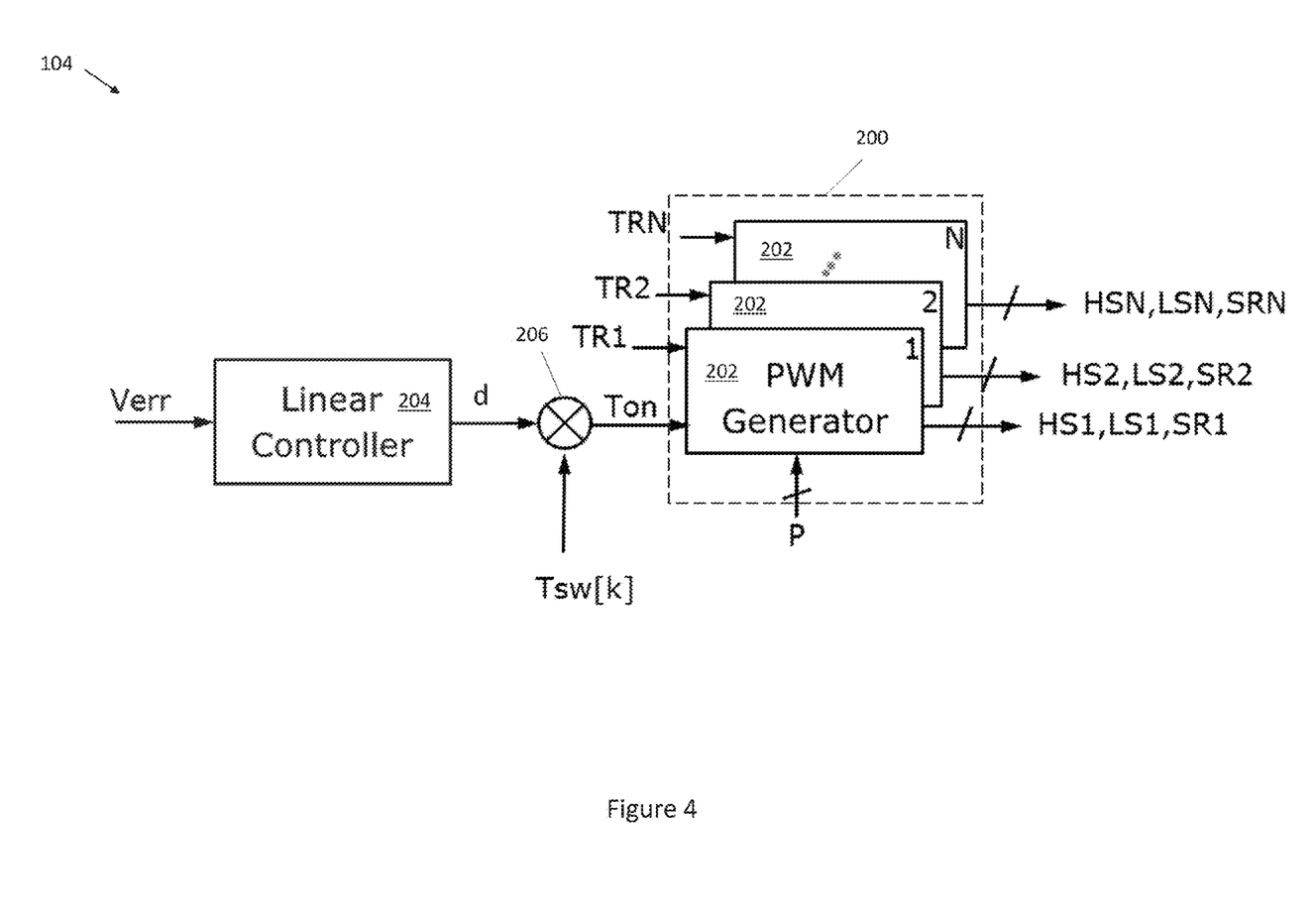
FIG. 4 illustrates a block diagram of an embodiment of the digital control system for the multi-phase voltage converter of FIG. 1.

FIG. 4 illustrates an embodiment of the digital control system 104. The digital control system 104 includes a digital PWM (pulse width modulation) state machine 200 operable to control cycle-by-cycle switching of the individual phases 108 of the multi-phase voltage converter 100. The digital PWM state machine 200 is implemented as a PWM generator 202 for each phase 108 of the multi-phase voltage converter 100. Each PWM generator 202 generates the gate signals (HS, LS, SR) provided to the drive circuitry 114 of the corresponding phase 108, for controlling the switches of that phase 108.

Figure 5:
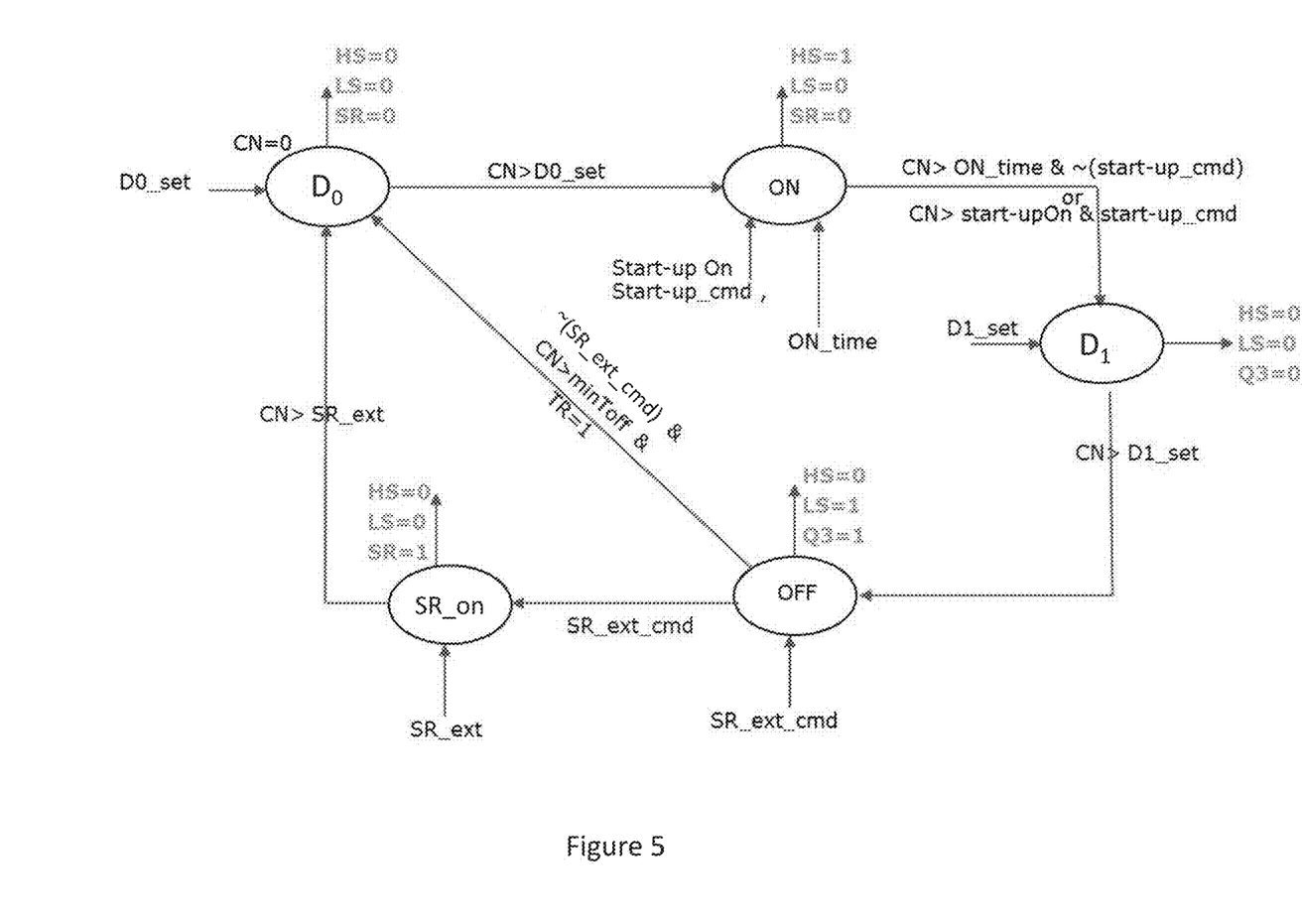
FIG. 5 illustrates a state transition diagram of an embodiment of a digital state machine implementation of the digital control system of FIG. 4.

FIG. 5 illustrates the different states of each PWM generator 202, and the triggering events or conditions which cause a transition from one state to another state. The state machine diagram illustrated in FIG. 5 applies to all of the phases 108 of the multi-phase voltage converter 100, and defines how each phase 108 moves from one state to another state. For each phase 108, the digital PWM state machine 200, at the beginning of each switching cycle, enters a first state 'ON' in which the control signal HS for the high-side switch of that phase 108 is activate and the respective control signals LS and SR for the low-side and SR switches of the phase 108 are deactivate e.g. by setting HS=1, LS=0 and SR=0 for the standard MOSFETs shown in FIG. 1. The first (ON) state corresponds to the Ton or on-time part of the present switching cycle e.g. as shown in FIGS. 2 and 3, during which the switch node voltage $V_{sw}$ is tied to Vin through the corresponding high-side power switch and the secondary current Is and magnetizing current $I_m$ of the phase 108 rise in a linear manner.

The digital PWM state machine 200 exits the first (ON) state and enters a second state '$D_1$' in which the control signals HS, LS and SR for all phase are deactivate e.g. by setting HS=0, LS=0 and SR=0 for the standard MOSFETs shown in FIG. 1. The second ($D_1$) state ensures sufficient dead time lapses before the digital PWM state machine 200 enters a third state ('OFF') in which the control signal HS for the high-side switch is deactivate and the respective control signals LS and SR for the low-side and SR switches of that phase 108 are activate e.g. by setting HS=0, LS=1 and SR=1 for the standard MOSFETs shown in FIG. 1. The third (OFF) state corresponds to the Toff or off-time part of the present switching cycle e.g. as shown in FIGS. 2 and 3, during which the switch node voltage $V_{sw}$ drops to its minimum value while the high-side power switch is off and the low-side power switch and the SR switch are on, and a resonance is formed between resonance capacitor $C_r$ and leakage inductance $L_r$.

The digital PWM state machine 200 exits the third (OFF) state after a minimum off-time expires and enters a fourth (SR_on) state in which the respective control signals HS and LS for the high-side and low-side switches of the phase are deactivate and the control signal SR for the SR switch is activate e.g. by setting HS=0, LS=0 and SR=1 for the standard MOSFETs shown in FIG. 1, and then exits the fourth (SR_on) state and enters a fifth state ('$D_0$') in which the control signals HS, LS and SR for all switches are deactivate e.g. by setting HS=0, LS=0 and SR=0 for the standard MOSFETs shown in FIG. 1. The fifth ($D_0$) state corresponds to the dead time $D_0$ shown in FIGS. 2 and 3, which ensures that all phase switches are deactivated (i.e. not turned on) for a sufficient amount of time before entering the first (ON) state in the next switching cycle. Dead time $D_0$ is the amount of time needed for the switch node capacitor $C_r$ to be charged to an amount close to Vin, resulting in soft switching (ZVS—zero voltage switching) of the high-side switch.

The digital PWM state machine 200 can instead exit the third (OFF) state and enter the fifth ($D_0$) state without entering the fourth (SR_on) state. In either case, the digital PWM state machine 200 exits the fifth ($D_0$) state and enters the first (ON) state at the beginning of the next switching cycle.

Continuing with reference to the state diagram illustrated in FIG. 5, an embodiment of the triggering events/conditions which cause the digital PWM state machine 200 to transition from one state to another state are described next in more detail. For each phase 108 and in normal operation, the digital PWM state machine 200 exits the first (ON) state and enters the second ($D_1$) state responsive to counter output CN exceeding predetermined value ON_time. ON_time indicates the amount of time the high side switch is on and the low-side and SR switches of the phase 108 are off, the timing of which is shown in greater detail in FIGS. 2 and 3.

ON_time can vary from cycle-to-cycle as can the switching frequency, responsive to load conditions.

Prior to entering normal cycle-by-cycle switching operation, the multi-phase voltage converter 100 may be in a powered-down/off mode, a calibration mode, etc. Under these conditions, the digital PWM state machine 200 enters the first (ON) state responsive to a startup command Startup_cmd which indicates that multi-phase voltage converter 100 should enter a startup period. The digital PWM state machine 200 remains in the first (ON) state until counter output CN exceeds predetermined value Start-upON which indicates the end of the startup period. This way, provision is made for entering the first (ON) state prior to normal cycle-by-cycle switching operation of the multi-phase voltage converter 100.

Once in the second ($D_1$) state, the digital PWM state machine 200 remains in the second ($D_1$) state until counter output CN exceeds predetermined value D1_set. D1_set indicates the amount of dead time between turning off the high-side switch and turning on the low-side and QR switches of the phase, the timing of which is shown in greater detail in FIG. 3.

The digital PWM state machine 200 exits the third (OFF) state and enters the fourth (SR_on) state responsive to an external command SR_ext_cmd which indicates that the digital PWM state machine 100 should enter the fourth (SR_on) state. In one embodiment, the external command SR_ext_cmd indicates a step-down voltage transient condition at the load 102 coupled to the multi-phase voltage converter 100. In another embodiment, the external command SR_ext_cmd indicates a reduced output voltage target for the load 102. In either case, the SR switch of that phase 108 remains active (i.e. turned on) in the fourth (SR_on) state so as to sink current to ground more rapidly, more quickly alleviating the transient condition or step-down event at the load 102.

The digital PWM state 200 machine exits the fourth (SR_on) state and enters the fifth (D0) state responsive to counter output CN exceeding predetermined value SR_ext. The digital control system 104 can set the value of SR_ext based on different expected transient conditions and/or target output voltage changes at the load 102. In one embodiment, different values for SR_ext can be stored in a look-up table which can be indexed based on the type of actual transient condition/target output voltage change at the load 102.

In the case of the digital PWM state machine 200 exiting the third (OFF) state and entering the fifth ($D_0$) state without entering the fourth (SR_on) state, several conditions/triggers are satisfied before the transition occurs. One trigger is the activation of a zero-current switching signal TR which indicates that the half cycle sinusodial-like current conducted by the SR switch of that phase 108 crossed or nearly crossed zero. The zero-current switching signal TR is generated by the digital control system 104 while the state machine is the third (OFF) state. FIG. 2 shows three different ways to generate the zero-current switching signal TR based on current information available to the digital control system 104. The first and third approaches utilize an estimated magnetizing current $I_m$ during the Toff period of the present switching cycle as given by:

$$\frac{dI_m}{dt} = -n\frac{V_o}{L_m} \quad (1)$$

where n is the turns ratio of the transformer/tapped-inductor 112 which couples the LC tank of the phase 108 to the output capacitor $C_o$ of the multi-phase voltage converter 100, Vo is the output voltage and $L_m$ is the magnetizing inductance of the transformer/tapped-inductor 112.

The second approach detects the zero-crossing or near zero-crossing point of the SR switch current $I_{SR}$. FIG. 2 illustrates the zero-current switching signal TR being activated responsive to the half cycle sinusodial-like current conducted by the SR switch crossing or nearly crossing zero, and FIG. 4 shows respective zero-current switching signals TR1, TR2, ..., TRN being provided to each PWM generator 202 of the multi-phase voltage converter 100. The digital control system 104 generates the respective zero-current switching signals.

A second trigger for exiting the third (OFF) state and entering the fifth ($D_0$) state without entering the fourth (SR_on) state is counter output CN exceeding predetermined value minToff. The value of minToff indicates a minimum amount of time the phase 108 is to remain in the third (OFF) state. An additional condition is the absence of the external command SR_ext_cmd, the absence of which indicates that no transient condition or step-down event has occurred at the load 102 and the digital PWM state machine 200 does not need to enter the fourth (SR_on) state. If all three of these triggers/conditions are satisfied, the digital PWM state machine 200 exits the third (OFF) state and enters the fifth ($D_0$) state without entering the fourth (SR_on) state.

The digital PWM state machine 200 exits the fifth ($D_0$) state and enters the first (ON) state at the beginning of the next switching cycle responsive to counter output CN exceeding predetermined value $D_0$_set. $D_0$_set indicates the amount of dead time between the low-side and SR switches of the phase 108 turning off and the high-side switch turning on again in the next switching cycle.

A single counter CN can provide the different predetermined values used as triggers/conditions for moving the digital PWM state machine 200 from one state to another state, and can be reset at the beginning of each switching cycle as indicated by 'CN=0' in the fifth ($D_0$) state of FIG. 5. Alternatively, a separate counter can be utilized for the different predetermined values, each counter being reset after the corresponding predetermined value is reached. The counter(s) can be implemented as part of the digital control system 104, and can run at the same or different clock rate as the digital control system 104.

The digital control system 104 also includes a linear controller 204 such as a PID (proportional-integral-derivative) controller, as illustrated in FIG. 4. The linear controller 204 determines the duty cycle (d) for each switching cycle, based at least partly on a voltage error signal Verr which indicates the difference between the output voltage Vo and a reference voltage. The digital control system 104 converts 206 the duty cycle d to on-time Ton based on the period Tsw[k] of the immediately preceding switching cycle [k]. The digital PWM state machine 200 controls cycle-by-cycle switching of the phases 108 based on the per-cycle adjusted on-time Ton as previously described herein.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A digital control system for a multi-phase voltage converter, each phase including a high-side switch connected between an input voltage terminal and a switching node, a low-side switch connected between the switching node and ground, a passive circuit connecting the switching node to a common output node of the multi-phase voltage converter, and a synchronous rectification (SR) switch connected between the passive circuit and ground and through which a half cycle sinusodial-like current is conducted when turned on, the digital control system comprising:
   a digital PWM (pulse width modulation) state machine operable to control cycle-by-cycle switching of the phases, wherein for each phase the digital PWM state machine is operable to:
      at the beginning of each switching cycle, enter a first state in which a control signal for the high-side switch is activate and control signals for the low-side and SR switches are deactivate;
      exit the first state and enter a second state in which the control signals for all switches are deactivate;
      exit the second state and enter a third state in which the control signal for the high-side switch is deactivate and the control signals for the low-side and SR switches are activate;
      exit the third state and enter a fourth state in which the control signals for the high-side and low-side switches are deactivate and the control signal for the SR switch is activate and then exit the fourth state and enter a fifth state in which the control signals for all switches are deactivate, or exit the third state and enter the fifth state without entering the fourth state; and
      exit the fifth state and enter the first state at the beginning of the next switching cycle.

2. The digital control system of claim 1, wherein for each phase the digital PWM state machine is operable to exit the first state and enter the second state responsive to a first counter output exceeding a first predetermined value.

3. The digital control system of claim 1, wherein for each phase the digital PWM state machine is operable to exit the second state and enter the third state responsive to a second counter output exceeding a second predetermined value.

4. The digital control system of claim 1, wherein for each phase the digital PWM state machine is operable to exit the third state and enter the fourth state responsive to an external command which indicates that the digital PWM state machine should enter the fourth state.

5. The digital control system of claim 4, wherein the external command indicates a step-down voltage transient condition at a load coupled to the multi-phase voltage converter or a reduced output voltage target for the load.

6. The digital control system of claim 4, wherein for each phase the digital PWM state machine is operable to exit the fourth state and enter the fifth state responsive to a third counter output exceeding a third predetermined value.

7. The digital control system of claim 1, wherein for each phase the digital PWM state machine is operable to exit the third state and enter the fifth state without entering the fourth state responsive to:
   a zero-current switching signal which indicates that the half cycle sinusodial-like current conducted by the SR switch crossed or nearly crossed zero;
   a fourth counter output exceeding a fourth predetermined value; and
   absence of an external command indicating that the digital PWM state machine should enter the fourth state.

8. The digital control system of claim 1, wherein for each phase the digital PWM state machine is operable to exit the fifth state and enter the first state at the beginning of the next switching cycle responsive to a fifth counter output exceeding a fifth predetermined value.

9. The digital control system of claim 1, wherein the digital PWM state machine is further operable to enter the first state responsive to a startup command which indicates that multi-phase voltage converter should enter a startup period, and remain in the first state until a first counter output exceeds a first predetermined value which indicates the end of the startup period.

10. The digital control system of claim 1, further comprising a linear controller operable to determine a duty cycle for each switching cycle, wherein the digital control system is operable to convert the duty cycle to an on-time for each switching cycle which is adjusted based on the period of the immediately preceding switching cycle, and wherein the digital PWM state machine is operable to control cycle-by-cycle switching of the phases based on the adjusted on-time for each switching cycle.

11. The digital control system of claim 1, wherein for each phase:
   the passive circuit comprises an LC tank coupled to the switching node of that phase and a transformer/tapped-inductor for coupling the LC tank to an output capacitor of the multi-phase voltage converter; and
   the SR switch is coupled between the transformer/tapped-inductor and ground.

12. A method of digitally controlling cycle-by-cycle switching of a multi-phase voltage converter, each phase including a high-side switch connected between an input voltage terminal and a switching node, a low-side switch connected between the switching node and ground, a passive circuit connecting the switching node to a common output node of the multi-phase voltage converter, and a synchronous rectification (SR) switch connected between the passive circuit and ground and through which a half cycle sinusodial-like current is conducted when turned on, the method comprising for each phase:
   at the beginning of each switching cycle, entering a first state of a digital PWM (pulse width modulation) state machine in which a control signal for the high-side switch is activate and control signals for the low-side and SR switches are deactivate;
   exiting the first state and entering a second state of the digital PWM state machine in which the control signals for all switches are deactivate;
   exiting the second state and entering a third state of the digital PWM state machine in which the control signal for the high-side switch is deactivate and the control signals for the low-side and SR switches are activate;
   exiting the third state and entering a fourth state of the digital PWM state machine in which the control signals for the high-side and low-side switches are deactivate and the control signal for the SR switch is activate and then exiting the fourth state and entering a fifth state of the digital PWM state machine in which the control signals for all switches are deactivate, or exiting the third state and entering the fifth state without entering the fourth state; and exiting the fifth state and entering the first state at the beginning of the next switching cycle.

13. The method of claim 12, wherein for each phase the digital PWM state machine exits the first state and enters the second state responsive to a first counter output exceeding a first predetermined value.

14. The method of claim 12, wherein for each phase the digital PWM state machine exits the second state and enters the third state responsive to a second counter output exceeding a second predetermined value.

15. The method of claim 12, wherein for each phase the digital PWM state machine exits the third state and enters the fourth state responsive to an external command which indicates that the digital PWM state machine should enter the fourth state.

16. The method of claim 15, wherein the external command indicates a step-down voltage transient condition at a load coupled to the multi-phase voltage converter or a reduced output voltage target for the load.

17. The method of claim 15, wherein for each phase the digital PWM state machine exits the fourth state and enters the fifth state responsive to a third counter output exceeding a third predetermined value.

18. The method of claim 12, wherein for each phase the digital PWM state machine exits the third state and enters the fifth state without entering the fourth state responsive to:
   a zero-current switching signal which indicates that the half cycle sinusodial-like current conducted by the SR switch crossed or nearly crossed zero;
   a fourth counter output exceeding a fourth predetermined value; and
   absence of an external command indicating that the digital PWM state machine should enter the fourth state.

19. The method of claim 12, wherein for each phase the digital PWM state machine exits the fifth state and enters the first state at the beginning of the next switching cycle responsive to a fifth counter output exceeding a fifth predetermined value.

20. The method of claim 12, further comprising:
   entering the first state responsive to a startup command which indicates that multi-phase voltage converter should enter a startup period; and
   remaining in the first state until a first counter output exceeds a first predetermined value which indicates the end of the startup period.

21. The method of claim 12, further comprising:
   determining a duty cycle for each switching cycle; and
   converting the duty cycle to an on-time for each switching cycle which is adjusted based on the period of the immediately preceding switching cycle,
   wherein the cycle-by-cycle switching of the phases is digitally controlled based on the adjusted on-time for each switching cycle.

* * * * *